United States Patent
Rignell (10) Patent No.: US 7,121,465 B2
(45) Date of Patent: Oct. 17, 2006

(54) ACTIVATION OF PRODUCTS WITH EMBEDDED FUNCTIONALITY IN AN INFORMATION MANAGEMENT SYSTEM

(75) Inventor: Mårten Rignell, Dalby (SE)

(73) Assignee: Anoto AB, Lund (SE)

( * ) Notice: Subject to any disclaimer, the term of this patent is extended or adjusted under 35 U.S.C. 154(b) by 420 days.

(21) Appl. No.: 10/329,423

(22) Filed: Dec. 27, 2002

(65) Prior Publication Data

US 2003/0122746 A1     Jul. 3, 2003

Related U.S. Application Data

(60) Provisional application No. 60/346,295, filed on Jan. 9, 2002.

(30) Foreign Application Priority Data

Dec. 27, 2001   (SE)   .................................... 0104398

(51) Int. Cl.
*G06K 7/14*   (2006.01)
(52) U.S. Cl. .................... 235/454; 235/472.01
(58) Field of Classification Search ............... 235/454, 235/472.01–472.03; 345/178, 179
See application file for complete search history.

(56) References Cited

U.S. PATENT DOCUMENTS

| | | | | |
|---|---|---|---|---|
| 5,477,012 A | * | 12/1995 | Sekendur | 178/18.09 |
| 5,969,712 A | * | 10/1999 | Morita et al. | 345/179 |
| 6,100,877 A | * | 8/2000 | Chery et al. | 345/178 |
| 6,208,771 B1 | | 3/2001 | Jared et al. | |
| 6,330,976 B1 | * | 12/2001 | Dymetman et al. | 235/487 |

FOREIGN PATENT DOCUMENTS

| | | |
|---|---|---|
| WO | WO99/50736 | 10/1999 |
| WO | WO99/50787 | 10/1999 |
| WO | WO00/72133 A1 | 11/2000 |
| WO | WO01/48591 A1 | 7/2001 |
| WO | WO01/48678 A1 | 7/2001 |
| WO | WO01/48685 A1 | 7/2001 |
| WO | WO01/61449 A2 | 8/2001 |
| WO | WO01/74598 A1 | 10/2001 |
| WO | WO01/75779 A1 | 10/2001 |
| WO | WO02/19260 A1 | 3/2002 |

OTHER PUBLICATIONS

Application Development Kit, Anoto AB, (2003).

* cited by examiner

Primary Examiner—Thien M. Le
Assistant Examiner—Jamara A. Franklin
(74) Attorney, Agent, or Firm—Birch, Stewart, Kolasch & Birch, LLP (57) ABSTRACT

A software tool and a method are intended for developing a service associated with a product with at least one position-coded functional area. A digital pen which detects a position on the product is caused, when using the service, to initiate in a processing unit an event which uses the position recorded by the pen. The software tool comprises a program module with instructions corresponding to the steps of creating a program object (204, 205) which is intended for the processing unit and which, on receipt of a data set from the pen, automatically generates a data structure (206) by extracting data items from the data set and by matching the extracted data items against a filter object (202) which contains information about the positions within each functional area on the product, whereby the data structure (206) enables sorting of at least some of the data items by functional area and implementing of the event associated therewith.

26 Claims, 7 Drawing Sheets

ACTIVATION OF PRODUCTS WITH EMBEDDED FUNCTIONALITY IN AN INFORMATION MANAGEMENT SYSTEM

This application claims priority on provisional Application No. 60/346,295 filed on Jan. 9, 2002, the entire contents of which are hereby incorporated by reference.

FIELD OF THE INVENTION

The present invention relates generally to activation of products with embedded functionality in an information management system, and to development of services associated with such products.

BACKGROUND ART

Many people use pen and paper instead of a computer to write short texts, especially notes from telephone conversations and meetings. The reason may be, for example, that no computer is available, that the person does not have both hands free to efficiently input text via a keyboard, that the person cannot quickly and easily combine text and sketches into expressive messages by means of a computer, or that it takes long to start the proper program in the computer. Even if the notes are written on a sheet of paper, it is in many cases desirable to input selected parts thereof into a computer, for instance a note about a meeting into a digital calendar or address information into a digital address book.

In order to increase the possibilities of using pen and paper in digital contexts, use of different types of digital pens has been suggested, which during the writing of information are capable of recording their movement across a passive base, such as a sheet of paper.

Such a digital pen, developed by the present Applicant, is based on detection of a position code on the base. When put down on the base, the pen is made to continually detect the position code locally at the pen point. This results in a sequence of positions which together constitute a digital description of the movement of the pen across the base during the writing of information.

Such a position-coded product can have embedded functionality by different positions on the product being dedicated to different functions or events. For instance, the product can have a functional area for recording of handwriting, a functional area for character interpretation of the noted information, a functional area which in the digital pen initiates transmission of all the information noted on the product, etc.

Furthermore the position code may be capable of coding a very large number of absolute positions, which make up an imaginary surface which is much larger than an individual base. The present Applicant has in Publications WO 01/48591, WO 01/48685 and WO 01/48678, which are herewith incorporated by reference, described information management systems which are based on the principle that different positions on this imaginary surface are dedicated to different functions and/or operators. Such an information management system may contain a plurality of digital pens, a multiplicity of position-coded products and a plurality of processing units communicating with the digital pens. In the system, the information is automatically directed to a certain processing unit based on its position contents. Each processing unit is in turn dedicated to processing the received information based on its position contents.

To allow different operators to develop services in the above information management systems, the present Applicant has also demonstrated a computer-based development tool, which is described in the brochure "Application Development Kit—Develop your applications enabling Anoto functionality", dated 3 Aug. 2001.

The development tool comprises a graphical design tool in the form of a plug-in to existing graphical programs such as Quark XPress. Thus, a designer is allowed to create graphics (text, frames, images, etc.) for a product and connect this graphics to the above-mentioned position code. The graphical design tool creates what is called a PAD file, which specifies the connection between the position code and the functional areas on the product.

The development tool also comprises a software development program which allows a programmer to call low-level instructions for communication with the digital pens and, thus, build server software which in the processing unit reads data from digital pens and implements a certain service based on this data. In the development of the server software, use is made of the above PAD file to translate received positions into functional areas, which in turn are connected to given operations on associated position data.

The above development tool, which is described in more detail in Patent Application PCT/SE01/1842, which however has not been published at the filing of the present application, is above all intended for development of high volume products, typically printed matter in the form of magazines, brochures, notepads, calendars, reminder notes (Post-It®), books, mouse pads, maps etc.

Usually four different parties cooperate in development of such a high volume product and in activation of the same in the information management system: a service provider who performs the service on the processing unit, a graphic designer who develops the product for the service provider, a software developer which develops the server software for the processing unit of the service provider, and a printing office that produces the product based on material from the graphic designer. It will be appreciated that the development work is relatively time-consuming and complex, necessitating coordination of the work of the parties. In some cases, iterations between different parties may also be required, for instance between the graphic designer and the software developer.

A development process as stated above can in some cases appear too expensive and time-consuming, above all when producing products of a more small-scale, short-lived and/or simpler type, such as forms, blanks, circulars etc. There is thus a need also for a simpler technique for producing products with embedded functionality as stated above.

An equivalent need may also be found in other types of information management systems, for instance those described in WO 99/50787, U.S. Pat. No. 6,208,771 and WO 01/61449. Also these systems comprise digital user units which are adapted to read a data set on a product with embedded functionality, and a processing unit which is adapted to receive the data set and implement an event associated therewith.

Prior art also includes WO 01/75779, which describes a technique for generating forms by applying graphics to a substrate preprinted with a position code.

SUMMARY OF THE INVENTION

An object of the present invention thus is to wholly or at least essentially satisfy the above needs.

This and other obejcts, that will be evident from the following description, are achieved wholly or partly by software tools and method as recited in the claims. Preferred embodiments are defined in the dependent claims.

According to the invention, a tool is thus provided, which allows an operator to automatically generate a program object which is intended for the processing unit and which communicates with and extracts desired data from the user units in the information management system. This decreases the need to make use of a software developer for developing the above-mentioned server software.

If the product contains functional areas which each are to be associated with an event in the system, the tool can allow the operator to generate the program object in such a manner that at least some of the desired data is sortable by functional area, which further simplifies the work of associating events or operations with data recorded by the user units.

The above sortability can be achieved by matching extracted data against a filter object, which contains information about the positions within each functional area on the current product.

The filter object can also contain a connection between each functional area and an associated subset of a coding pattern if the functional areas of the product contain such subsets.

The filter object can be generated by the tool based on graphic data describing the appearance or layout of the product. According to the invention, a plurality of different embodiments for easy generation of the filter object are provided, which embodiments reduce the need to make use of a graphic designer specialized in development of products with embedded functionality.

Several such embodiments according to the invention are based on use of substrates with a preprinted coding pattern. Thus, a product can easily be produced by applying graphics to the substrate. This can be carried out by means of a conventional printer, which decreases the need to make use of a printing office for producing products with embedded functionality.

When using preprinted substrates, the above-mentioned connection between functional areas and subsets of the coding pattern can be effected in the tool, with a minimum of contribution on the part of the operator, by inputting substrate data which identifies the coding pattern on the substrate, and by automatic connection of the above graphic data to the thus identified coding pattern. Such substrate data may consist of e.g. a coding-pattern-describing file or an identity code on the substrate. If the coding pattern codes positions, said substrate data may consist of a position range in each dimension on the substrate.

According to an alternative embodiment, the connection between functional areas and subsets of the coding pattern can be effected in the tool based on a test product, which is generated by application of said graphic data to a substrate with a preprinted coding pattern. In this case, the tool may output instructions to the operator to mark, with the aid of a reading means, such as one of the user units, the functional areas on the test product. This reading means is capable of detecting its position on the product, preferably by decoding the coding pattern. Thus, the tool can receive from the reading means a data set which indicates positions of the functional areas on the test product. This embodiment is simple and, owing to the feedback from a test product, puts low demands on the equipment used for application of the graphics to the substrate.

As mentioned by way of introduction, the coding pattern can be adapted to code absolute positions on an imaginary surface. In this case, the filter object, for instance according to one of the above embodiments, can be generated to define the positions which within each functional area on the product are coded on the imaginary surface. Thus, the filter object contains an indication of the size and placement of the functional areas, which indication also connects the functional areas to associated subsets of the coding pattern.

According to an alternative embodiment, the filter object is generated instead to define the functional areas in local positions on the product, i.e. the placement and size of the functional areas on the product are given in relation to a local coordinate system on the product, for instance in relation to the boundary edges of the substrate. Thus, the generation of the filter object can be entirely disconnected from the coding pattern on the product, which can simplify the design work significantly and further reduce the need to make use of a specialized graphic designer for producing products with embedded functionality.

This alternative embodiment can be rendered possible by the tool allowing the operator to generate the program object so that this on the one hand extracts a product identity which identifies the product from which the received data set has been read and, on the other hand, correlates, based on the product identity, local positions on the product with positions on the imaginary surface. The program object is thus caused, in connection with extraction, to translate the local position indications of the filter object into positions on the imaginary surface, or to translate the position indications, received from the user units, on the imaginary surface into local positions on the current product.

Other objects and advantages as well as features of the invention will be evident from the following detailed description of the invention, from the appended claims as well as from the drawings.

BRIEF DESCRIPTION OF THE DRAWINGS

The invention will now be described by way of example and with reference to the accompanying drawings, which schematically illustrate a currently preferred embodiment and in which.

DESCRIPTION OF PREFERRED EMBODIMENTS

Figure 1:
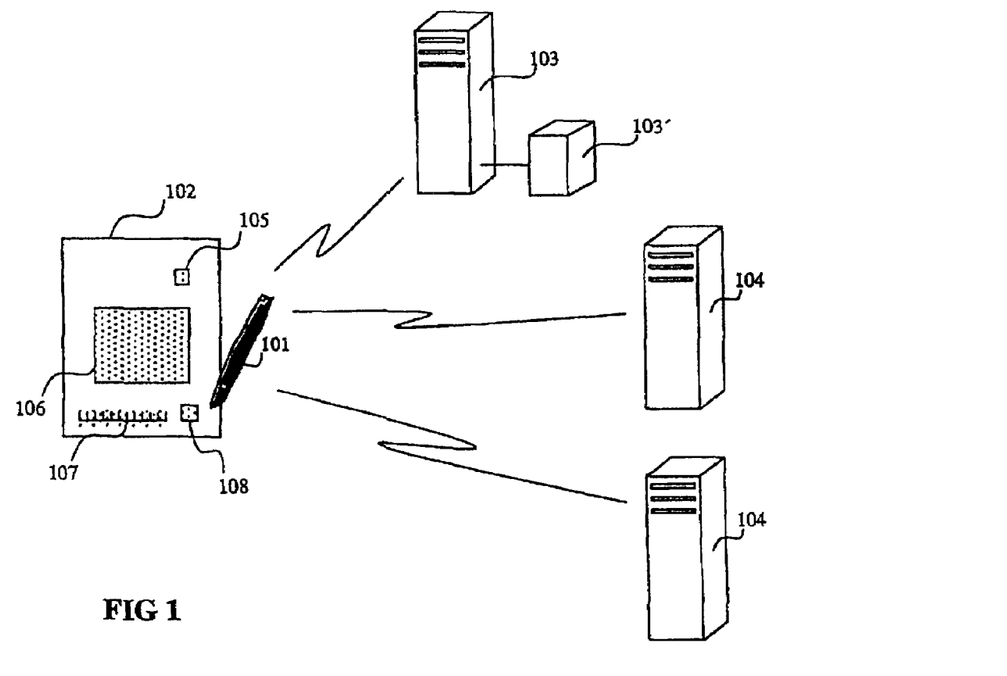
FIG. 1 is a general view of an information management system which contains products with embedded functionality.

FIG. 1 shows an information management system which is made up of a plurality of digital pens 101, a plurality of products 102 with a position-coded surface, a look-up unit 103 and a plurality of processing units 104, below referred to as processing units. The position code on the product is a subset of a global position-coding pattern. The principles of the information management system have been described above and will therefore not be repeated here.

The product 101 contains a number of position-coded functional areas 105–108. Each such functional area is in the system, via its position code, associated with a function or event. The functional areas can, for example, be dedicated to indicating a selection (selection field 105), generating a handwritten message (handwriting field 106), generating binarily representable characters based on handwriting (ICR field 107) and causing the pen to send all previously recorded information on the product (send icon 108). In addition to the functional areas 105–108, the product 1 is also provided with explanatory text (not shown).

The pen 101 is adapted to detect and decode the position code as soon as the pen 101 is put down on the product 102. The resulting sequence of decoded, absolute positions thus forms an electronic version of a physical pen stroke on the product 102. The electronic pen strokes can, awaiting transmission, be stored in a memory (not shown) in the pen 101.

The pens 101 communicate with the look-up unit 103 and the processing units 104 via one or more networks, such as computer and/or telephone networks.

The look-up unit 103 comprises one or more servers, which communicate with a database 103' containing information related to the imaginary surface which is made up by the global position-coding pattern. More specifically, the database 103' contains a connection between absolute positions on the imaginary surface and network addresses of the processing units 104 in the system.

Each processing unit 104 comprises one or more servers which implement a service, such as compiling, storing or transmitting information, or initiating transmission of information or products to a recipient.

When a user with his digital pen 101 marks the send icon 108 on the product 102, the pen 101 is caused to send to the look-up unit 103 a message with information related to the positions recorded from the product 102. The look-up unit can, by looking up in the database 103', return a network address to the pen 101, which then sends a message to the processing unit 104 at the received network address. The processing unit 104 then instructs the pen 101 to transmit a desired data set.

The imaginary surface is divided into digital pages. Each such digital page has a page identity which is unique in the system. The digital pages, which each contain a unique subset of the imaginary surface, are divided into groups having an identical page format. A template is assigned to such a group and defines the page size and any standard functional areas, for instance location and size of a send icon, an ICR field etc. These templates, and their connection to areas on the imaginary surface, are stored in the pen 101 so that this, based on decoded positions, can, for example, identify that the user has marked the send icon 108.

The system also has an administrator which, inter alia, records network addresses in the database 103' and licenses digital pages to service providers in the system.

A service provider, who wants to operate a service on a processing unit 104 in the system, must on the one hand develop position-coded products 102 which act as interfaces with the users in the system and, on the other hand, develop server software that implements the service on the processing unit 104.

In the system, a development tool is therefore provided in the form of a software package which the service provider can install on a computer in order to develop, on his own, both the server software and the products 102 in a small number of steps. The software package can be provided on a physical storage medium, for instance in the form of a diskette, CD-ROM etc, or in the form of propagating signals via a computer network. The main components of the software package will be described below with reference to FIG. 2.

Figure 2:
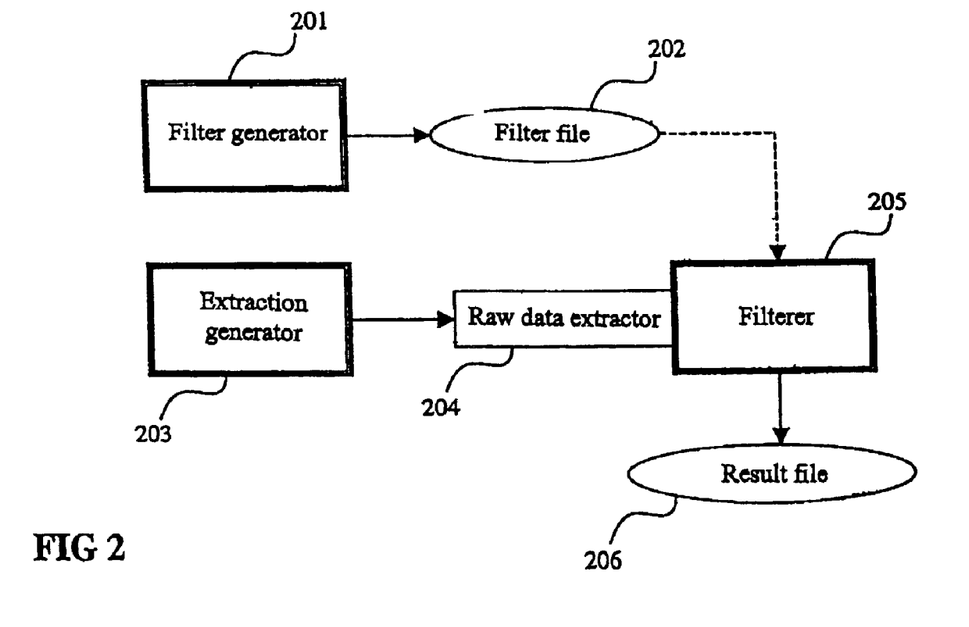
FIG. 2 is a block diagram over a software tool according to an embodiment of the present invention.

The software package includes a filter generator 201, into which the service provider can read in a graphics file from both standardized office programs, such as Word, Excel, PowerPoint®, and advanced programs for desktop publishing. The read-in graphics file defines the appearance or layout of the product, i.e. frames around its functional areas, associated text and images etc. Based on the graphics file and with knowledge of the position code of the product, the filter generator 201 generates a filter file 202 which connects each functional area to coded positions on the product.

The software package also contains an extraction generator 203, in which the service provider can generate a program which is intended for the processing unit and which reads out desired raw data from digital pens in the system and places this in an intermediary data structure, such as a file, table or the like. The extraction generator 203 allows the service provider to select, from a list of possible alternatives, which raw data is to be extracted. Such raw data can be all pen strokes on the current product, date of the pen stroke, time of the pen stroke, a unique ID of the current pen, a unique ID of the current product. Other raw data can be user data which is associated with the pen, such as charge card number, e-mail address, telephone number, delivery address etc. When the service provider has defined the desired raw data, the extraction generator automatically generates a raw data extractor 204 in the form of software which utilizes a set of low-level instructions for communication with the pens in the system.

Finally, the software package contains a filterer 205 which when executed on the processing unit reads in the filter file 202 and the intermediary data structure in order to sort the pen strokes by functional area on the current product. The filterer 205 creates a result file 206 which lists the pen strokes read from the pen sorted by the different functional areas on the current product. Depending on which other raw data the service provider has selected to read out from the pen, the result file may also contain, for instance, date, time, ID of the pen, ID of the product, user data etc.

Figure 3:
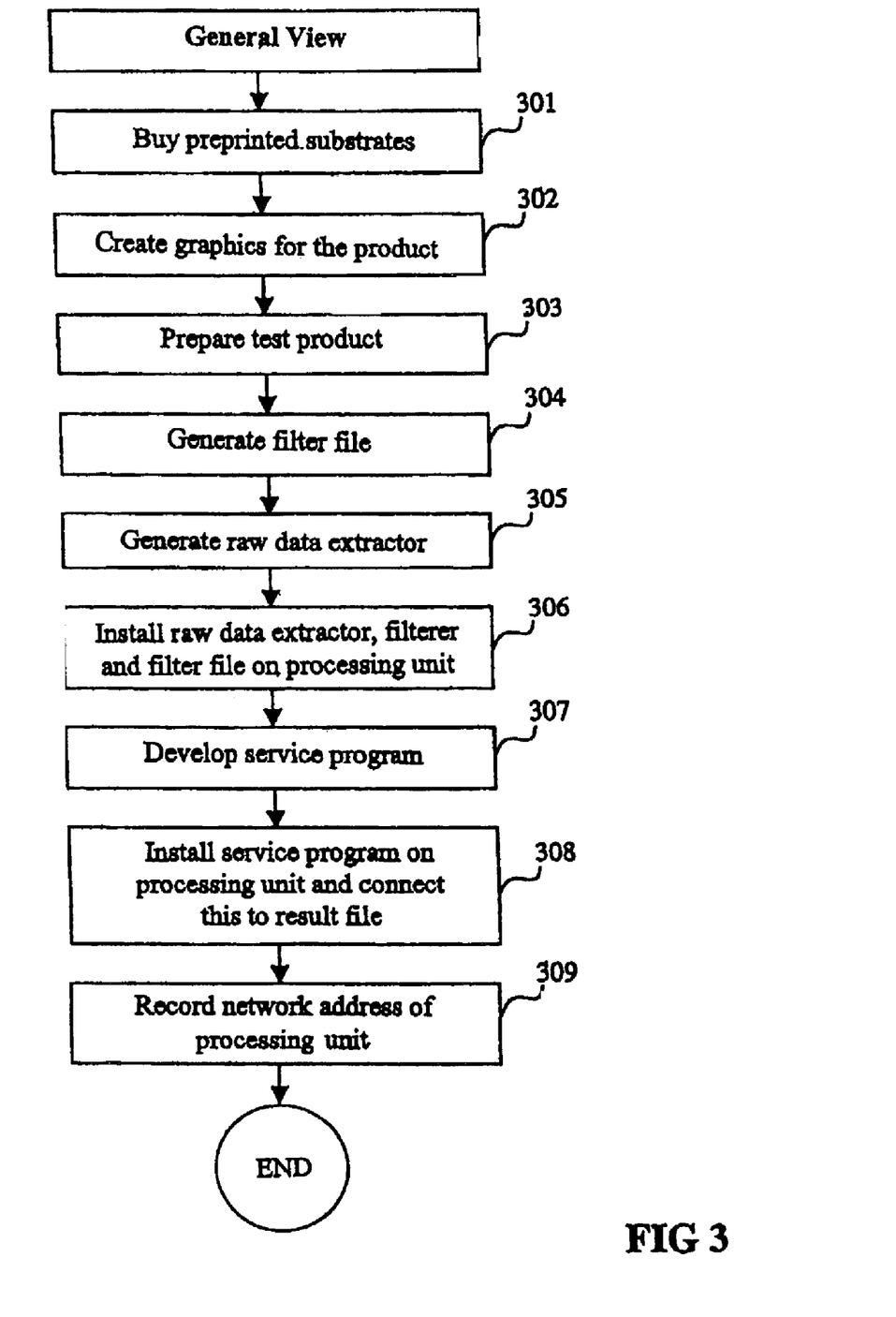
FIG. 3 is a flow chart of actions that can be carried out when developing and activating a product in the system in FIG. 1 using the present invention.

With reference to FIG. 3, now follows a general description of a mode of action for the service provider to develop and activate a product in the system in FIG. 1. To simplify the description, the product is assumed to consist of one sheet only.

In a first step 301, the service provider buys substrates in bulk from the administrator of the system. The substrates are preprinted with a position code and may also contain a send icon (cf. substrate 501 in FIG. 5). The position code is identical on all substrates and codes a continuous sequence of the positions in two dimensions within a digital page on the imaginary surface. Apart from the standard functional area forming the send icon, this digital page is wholly dedicated to recording pen strokes. In other words, the remaining positions on the digital page are not connected to any additional event in the system.

Subsequently, the service provider creates the graphics for the product in a commercial graphics program (step 302). The graphics is stored in a graphics file. The service provider then produces a test product (cf. test product 502 in FIG. 5) by initiating from the graphics program a printout of the graphics on a substrate (step 303). Alternatively, the graphics can be applied to another base and from there be transferred to the position-coded substrate by means of a copying machine.

Then the service provider starts the filter generator and generates a filter file corresponding to the test product (step 304), as will be described in more detail below with reference to FIGS. 4–5.

When the filter file has been generated, the service provider starts the extraction generator and selects the raw data from the pen that is necessary for the current service to be implemented. The extraction generator then creates automatically the raw data extractor (step 305) and links this to the filterer, which the service provider has installed on the processing unit together with the current filter file.

The raw data extractor can now be installed on the processing unit (step 306) and, together with the filterer and the filter file, be tested against a pen which is used on the test product.

The service provider can then on his own create a simple high-level program or macro which reads data from the result file (for instance in the form of a text file) in order to implement the current service (step 307). When the service program has been installed on the processing unit (step 308), the service can be taken into operation after the service provider in the above-mentioned database (103' in FIG. 1) has recorded a connection between the position code on the substrate and the network address of the processing unit (step 310). Thus, each data set which is read on the product 102 using a digital pen 101 in the system will, via the look-up unit 103, be directed to the processing unit 104.

Of course, also position-coded products are produced, conveniently by the service provider applying the graphics to the substrates (by means of a printer or copying machine) and in this way duplicating the test product.

As an alternative to the raw data extractor and the filterer consisting of two programs which are executed sequentially on the processing unit, these can be integrated into a single extraction program which when executed generates the above-mentioned result file.

Figure 4:
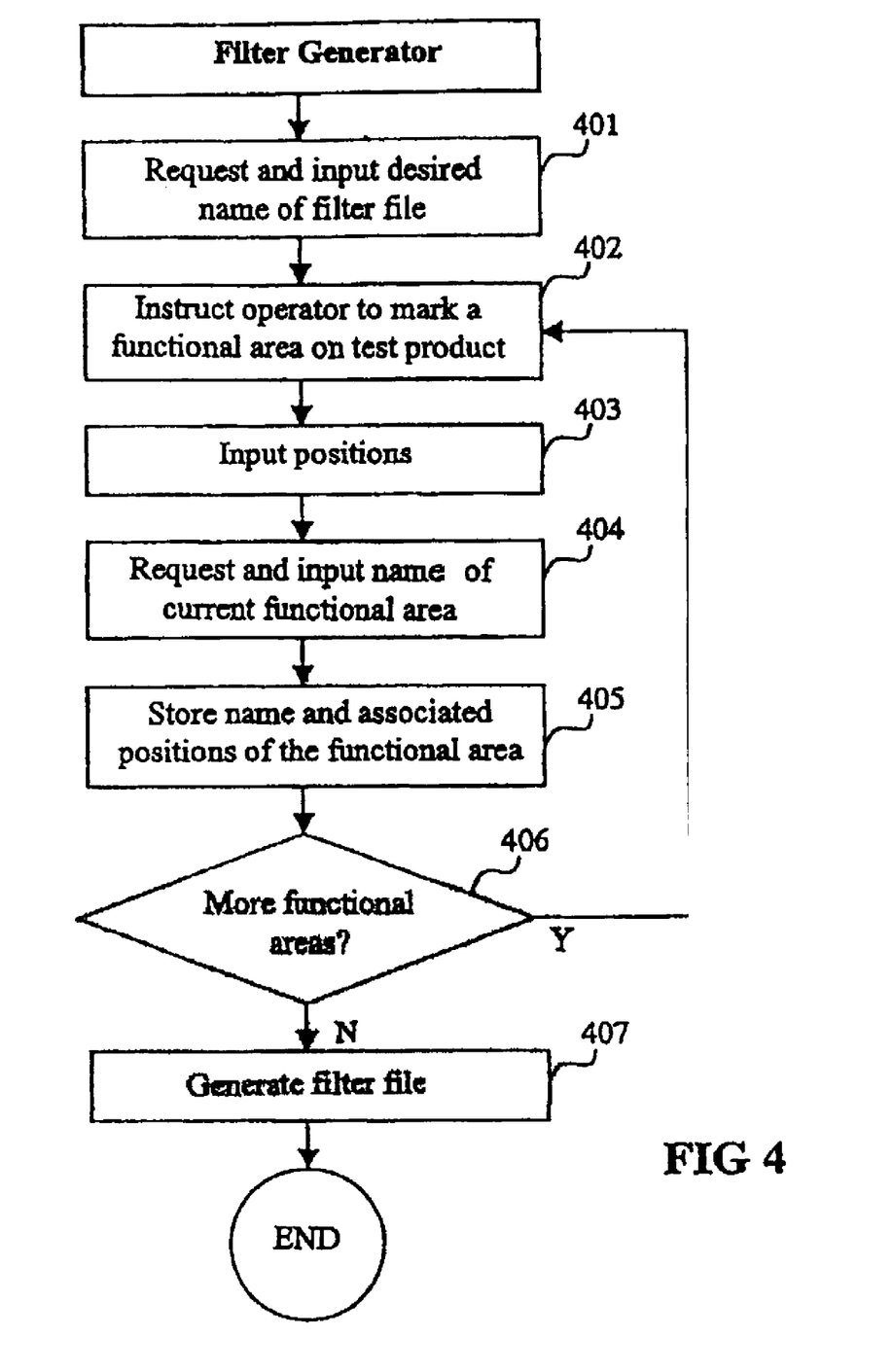
FIG. 4 is a flow chart of actions performed when executing a program module included in the software tool.
Figure 5:
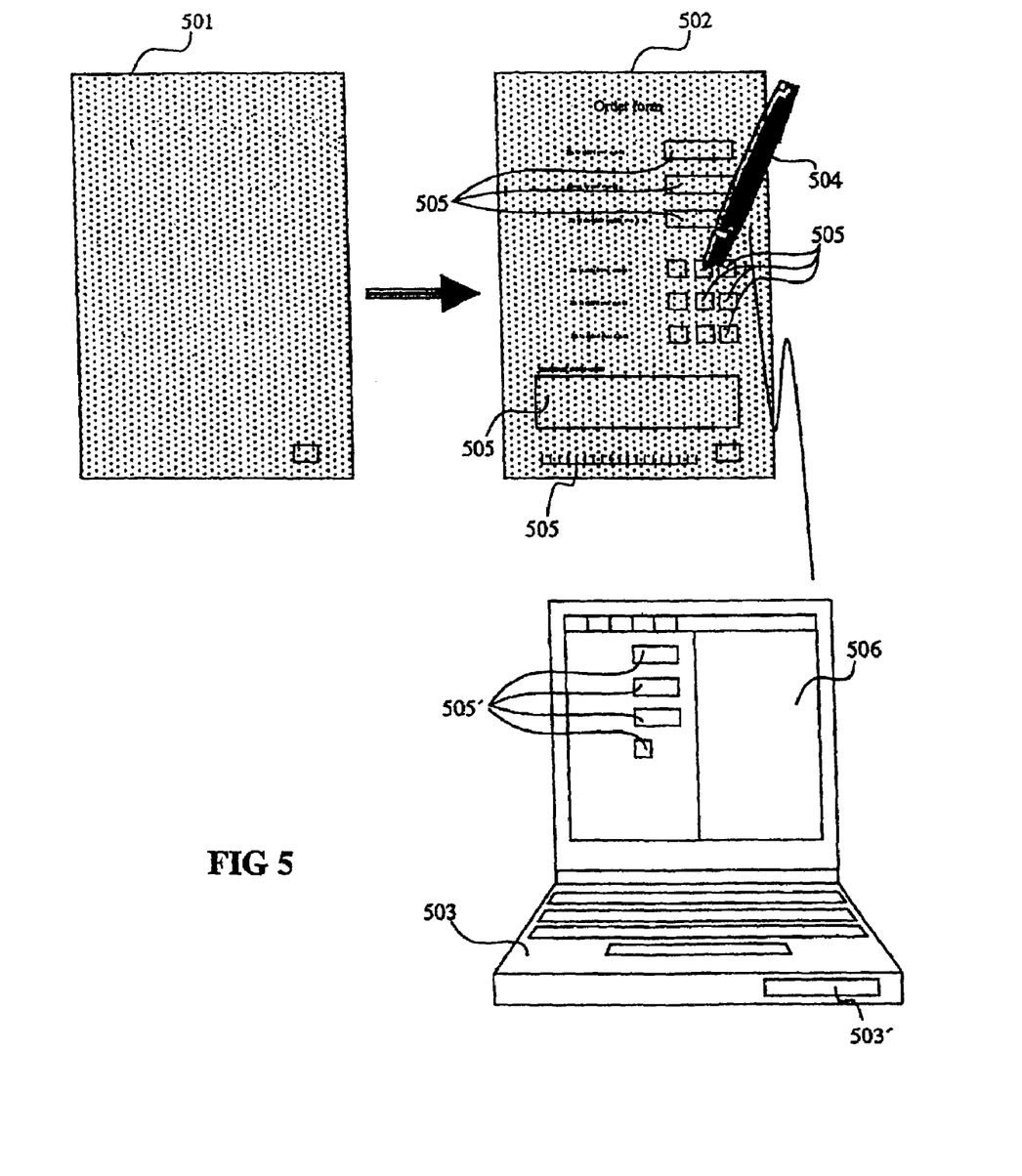
FIG. 5 is a general view which illustrates an embodiment of a partial step in the flow chart in FIG. 4.

FIGS. 4–5 illustrate an embodiment of the filter generator which is based on data acquisition from the test product 502. The filter generator is in this embodiment installed in a memory 503' on a computer 503 which communicates with a reading means 504, for instance a digital pen in the above system.

When the filter generator is started, the operator is requested to input the name of the filter file that is to be generated (step 401). After that the operator is instructed to mark a functional area 505 on the test product 502 (step 402). For instance the user can for rectangular functional areas be requested to mark two opposite corners. The filter generator reads positions from the reading means 504 (step 403), instructs the operator to input a name of the marked functional area (step 404), and then stores a connection between this name and the received positions (step 405). According to a preferred embodiment, the corresponding functional areas 5051 are drawn on a display 506 of the computer, as visual feed-back to the operator. The steps 402–405 are repeated until the operator indicates that all functional areas 505 have been marked, after which the program generates the filter file.

Figure 6:
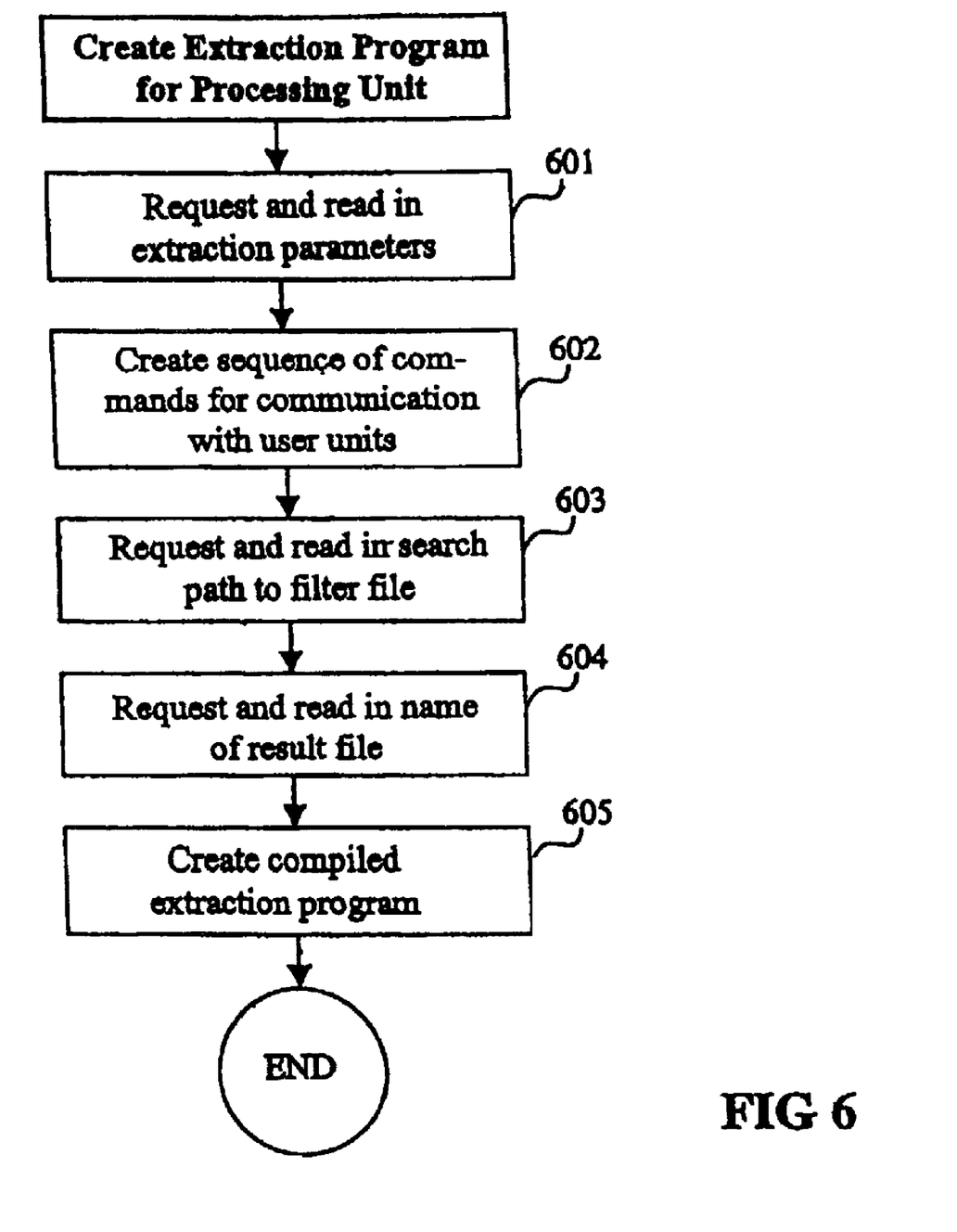
FIG. 6 is a flow chart of actions performed when executing another program module included in the software tool.

FIG. 6 describes a program tool for generating a combination of the raw data extractor and the filterer, i.e. an extraction program which receives data from the digital pens and directly generates the above-mentioned result file. First the operator is instructed to select, suitably from a list of possible alternatives, which raw data is to be extracted from the digital pens (step 601). After having received an instruction from the operator to generate the raw data extractor, the program tool generates automatically a sequence of commands for communication with the digital pens (step 602). Then the operator is instructed to identify the filter file (step 603) and indicate the name of the result file (step 604). It may here be convenient for the extraction program to generate a result file per session, i.e. per connection to a digital pen. Finally, the program tool generates a compiled extraction program which contains both the raw data extractor and the filterer (step 605).

Figure 7:
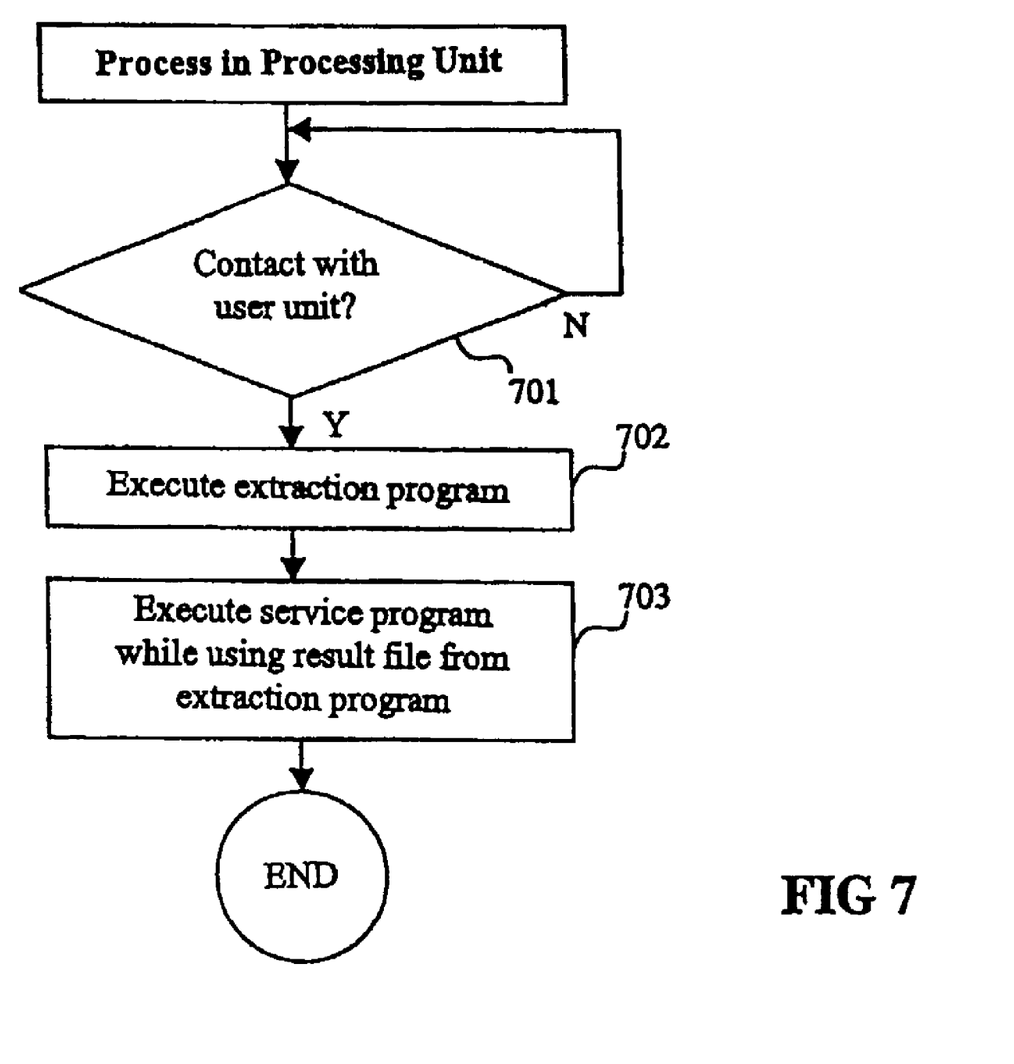
FIG. 7 is a flow chart of actions performed in a processing unit after activating a product in the system in FIG. 1.

FIG. 7 describes the process in the processing unit while the service is in operation. The processing unit usually monitors a network port while waiting for calls from digital pens in the system (step 701). In case of contact with a digital pen, the extraction program is executed automatically and requests the desired raw data from the pen, filters this raw data and generates a result file for the current session (step 702). The result file contains the pen strokes read from the pen and sorted by the various functional areas on the current product, which functional areas are identified with the names that the operator indicated when generating the filter file (step 405 in FIG. 4). The service program, which reads and processes data from the result file, is executed in step 703, which can be carried out immediately, or on a batch of result files.

It should be pointed out that the scope of the invention is not limited by the embodiments described above. The invention may be varied and modified in various ways within the scope of the appended claims.

According to an alternative embodiment, the filter generator allows the user to define new functional areas on the position-coded substrate with a digital pen. The user can thus sketch functional areas of the intended product directly on the substrate, while the corresponding positions are read in by the filter generator and there form a basis for the definition of the functional areas. If graphics has already been printed on the substrate, the handwritten functional areas can be incorporated into the existing graphics file. Otherwise the filter generator can be adapted to generate the graphics file based on the hand-drawn functional areas. The filter generator can also allow the operator to add, via the computer, text and images and perform a figure interpretation of the hand-drawn functional areas.

According to one more alternative embodiment, the filter generator is adapted to directly from a read-in graphics file connect functional areas to positions on the substrate, i.e. without feedback from a test substrate.

This can be achieved by the filter generator somehow obtaining information about the position code on the substrate, for instance by reading in a code-describing file which accompanies the substrate, or by the operator inputting the smallest and largest positions that are coded in the respective dimensions on the substrate.

The direct connection can alternatively be effected by the filter generator being adapted to generate a filter file which identifies the functional areas on the substrate in a local coordinate system, for instance relative to the boundary edges of the substrate. In this case, the filterer in the processing unit is suitably adapted to read, from the intermediary data structure, the above-mentioned product ID, which identifies the digital page on the imaginary surface that corresponds to the substrate, identify, based on this product ID, the position code on the product, and, before the filtering step, correlate position indications in the local coordinate system on the product with position indications on the imaginary surface. The correlation can result in the local positions of the filter file being translated into positions on the imaginary surface, or the received positions on the imaginary surface being translated into local positions on the product.

In many cases, the graphics can be applied, by means of a conventional laser or ink jet printer, to the substrate with sufficient positional accuracy to allow the above-mentioned direct connection. When greater positional accuracy is required, use is suitably made of a printer which is capable of decoding the position code on the substrate and applying an ink in the desired positions, so that the functional areas are located correctly on the substrate. Such a printer is described in Applicant's Patent Application WO 01/74598, which is herewith incorporated by reference.

According to an alternative, the substrate has no position code, i.e. instead of preprinted substrates the service provider obtains a digital description of the position code that is to be included in the product, and any predefined functional areas, such as the above-mentioned send icon. The development tool conveniently enables reading in of the digital description and a graphics file, and printing of both graphics and a position code on a substrate. The filter file can here be generated according to one of the different alternatives described above, i.e. by feedback from a test printout or via direct connection between graphics and positions.

It should further be appreciated that the present invention is also applicable to development and activation of products whose embedded functionality is based on something else than an absolute position code. For instance, the products can be provided with an identity code, for instance a character combination in plain language or in the form of a bar code, which can be read by the digital pens and communicated in the system for identification of the current product. In this case, the digital pens only have to be capable of recording their position locally on the product. This can be achieved, for instance, by analyzing signals sent from or to the pen (triangulation or time-of-flight-analysis), or by analyzing changes in an electromagnetic field generated around the product. Alternatively, it can be achieved by some prior-art technique for relative positioning, for instance mechanical position detectors or accelerometers incorporated in the pen, in combination with calibration against the base, for instance via recording of reference points on or around the product in connection with the writing of information.

The invention claimed is:

1. A software tool for use in activation of a product with embedded functionality in an information management system comprising digital user units, which are adapted to read a data set on the product, and at least one processing unit which is adapted to receive the data set and implement an associated event, said software tool comprising a first program module with instructions corresponding to the steps of: reading in a selection of extraction parameters; and creating a program object which is intended for the processing unit and which, on receipt of the data set, automatically generates a data structure with data items which are extracted from said data set according to said selection of extraction parameters, to enable said activation by associating said event with one or more of said data items.

2. The software tool as claimed in claim 1, in which the product comprises at least one functional area which in the system is to be associated with an event, the first program module creating the program object to generate the data structure such that at least some of the data items are sortable by functional area.

3. The software tool as claimed in claim 1, in which the product comprises at least one functional area which in the system is to be associated with an event, the first program module creating the program object to generate the data structure by extraction of said data items according to said selection of extraction parameters and by matching of the extracted data items against a filter object, which contains arrangement data defining the arrangement of the functional areas on the product from which the received data set has been read, wherein said matching results in at least some of the data items being sorted by functional area.

4. The software tool as claimed in claim 3, comprising a second program module, which is adapted to enable production of the product and which contains instructions corresponding to the steps of: receiving graphic data describing the visual appearance of the product; and generating an information object which defines said at least one functional area on the product, the information object defining at least one of size and placement of the functional area.

5. The software tool as claimed in claim 4, wherein the second program module contains instructions corresponding to the additional step of: identifying a connection between each functional area and a subset of a coding pattern on the product, said connection being included in the information object.

6. The software tool as claimed in claim 5, wherein the second program module is adapted to enable production of the product by applying said graphic data to a substrate with a preprinted coding pattern, the step of identifying the connection between functional areas and subsets comprising the partial steps of reading in substrate data which identifies the coding pattern on the substrate; and automatically connecting said graphic data to the thus-identified coding pattern.

7. The software tool as claimed in claim 5, wherein the step of identifying the connection between functional areas and subsets comprises the partial steps of: outputting instructions to an operator to mark, with the aid of a reading means, the functional areas on a test product, which is generated by applying said graphic data to a substrate with a preprinted coding pattern, the reading means as well as the user units being adapted to detect the reading means and the user units respective positions on the test product and the product respectively, based on the coding pattern; and receiving from the reading means a data set which indicates positions of the functional areas on the test product.

8. The software tool as claimed in claim 3, wherein a second program module generates the information object as an originator of the filter object.

9. The software tool as claimed in claim 8, in which said at least one functional area contains a subset of a coding pattern which is adapted to code absolute positions on an imaginary surface, the first program module creating the program object so that the program object extracts a product identity, which identifies the product from which the received data set has been read, and on the basis of the product identity correlates local positions on the product with positions on the imaginary surface, thereby allowing the second program module to generate the information object in local positions on the product.

10. The software tool as claimed in claim 1, wherein said data items at least partly correspond to sequences of positions on the product.

11. The software tool as claimed in claim 1, wherein the first program module creates the program object to generate the data structure such that said data items comprise a unique identity for the user unit that has read the received data set.

12. The software tool as claimed in claim 1, wherein the first program module creates the program object to generate the data structure such that said data items comprise a product identity which identifies the product from which the received data set has been read.

13. The software tool as claimed in claim 1, implemented on a storage medium.

14. The software tool as claimed in claim 1, stored in a computer.

15. The software tool as claimed in claim 1, implemented in a read only memory.

16. The software tool as claimed in claim 1, transported on an electric, propagating carrier signal.

17. A computer with a software tool as claimed in claim 1.

18. A software tool for developing a service connected to a product with at least one functional area which is provided with a position code which codes at least one position on an imaginary surface, a user unit which detects said at least one position being capable of initiating an event in a processing unit, which event utilizes said at least one position, said software tool comprising a program module with instructions corresponding to the steps of: creating a program object which is intended for the processing unit and which, on receipt of a data set from the user unit, automatically generates a data structure by extracting data items from the data set and by matching the extracted data items against a filter object which contains information about the positions within each functional area on the product, whereby the data structure enables sorting of at least some of the data items by functional area and implementation of the event associated therewith.

19. A software tool for use in producing a product with a coding pattern that embeds functionality in the product, comprising a program module with instructions corresponding to the steps of: retrieving graphic data describing the visual appearance of the product; based on said graphic data, identifying at least one functional area on the product; reading in substrate data which identifies the coding pattern on the product; automatically identifying a connection between each functional area and the coding pattern on the product; generating an information object which includes said connection; and outputting said information object for use in processing of data recorded from said product.

20. The software tool as claimed in claim 19, wherein the step of retreiving includes: reading in an electronic file, or scanning a substrate.

21. The software tool as claimed in claim 19, in which said substrate data is selected from the group comprising: a unique substrate identifier, a coding pattern definition, a range of positions to be coded by the coding pattern on the product, and positions recorded by scanning a substrate which is preprinted with the coding pattern and by decoding the thus-scanned coding pattern.

22. The software tool as claimed in claim 19, wherein the program module further comprises instructions corresponding to the step of: producing said product by initiating application of the graphic data to a substrate which is preprinted with the coding pattern.

23. The software tool as claimed in claim 19, wherein the program module further comprises instructions corresponding to the steps of: producing said product by initiating substantially simultaneous application of the graphic data and the coding pattern to a substrate.

24. A software tool for use in producing a product with a coding pattern that embeds functionality in the product, comprising a program module with instructions corresponding to the steps of: outputting instructions to an operator to mark, with the aid of a reading means, at least one intended functional area on a test product which comprises a preprinted coding pattern, the reading means being adapted to detect a position of the reading means based on the coding pattern; receiving from the reading means a data set which indicates positions of said at least one intended functional area on the test product; and generating an information object which defines the arrangement of said at least one functional area on the product to be produced.

25. The software tool as claimed in claim 24, wherein the program module further comprises instructions corresponding to the step of: generating the test product by initiating application of graphic data to a substrate which is preprinted with said coding pattern, the graphic data describing the visual apperance of the product to be produced.

26. A method for activation of a product with embedded functionality in an information management system comprising digital user units which are adapted to read a data set on the product, and at least one processing unit which is adapted to receive the data set and implement an event associated therewith, said method comprising: inputting to a software tool a selection of extraction parameters; causing the software tool to automatically create a program object which is intended for the processing unit and which, on receipt of a data set from said user unit, generates a data structure with data items which are extracted according to said selection of extraction parameters; and developing an event program object which in the processing unit reads in the data structure and implements said event while using one or more of said data items.

* * * * *